United States Patent [19]

Koch

[11] Patent Number: 5,123,547
[45] Date of Patent: Jun. 23, 1992

[54] EQUIPMENT FOR STORING AND SHIPPING PIPES

[75] Inventor: Robert Koch, Uelzen, Fed. Rep. of Germany

[73] Assignee: Drilltec Patents & Technologies Co., Inc., Houston, Tex.

[21] Appl. No.: 654,586

[22] Filed: Feb. 13, 1991

[30] Foreign Application Priority Data

Aug. 26, 1989 [DE] Fed. Rep. of Germany ....... 3928320

[51] Int. Cl.$^5$ .............................................. A47F 5/00
[52] U.S. Cl. .................................. 211/59.4; 211/60.1; 248/68.1
[58] Field of Search .................... 211/60.1, 70.4, 59.4; 248/68.1; 206/443

[56] References Cited

U.S. PATENT DOCUMENTS

| | | | |
|---|---|---|---|
| 4,167,211 | 9/1979 | Haller | 248/68.1 X |
| 4,195,732 | 4/1980 | Bell | 206/443 X |
| 4,378,923 | 4/1983 | Takai | 248/68.1 |
| 4,506,796 | 3/1985 | Thompson | 211/59.4 |
| 4,610,362 | 9/1986 | Remp et al. | 211/59.4 |

Primary Examiner—Robert W. Gibson, Jr.
Attorney, Agent, or Firm—Shlesinger Arkwright & Garvey

[57] ABSTRACT

The invention concerns equipment for storing and shipping pipes with several superposed pipe supports. To simplify manufacture and lower its costs and further to achieve versatility, the pipe supports (5) each comprise a long, integrated molding (120) with several cylindrical clearances (122, 124) present on two opposite sides, for several pipes, or several short assembled molded segments (2) with at least one cylindrical clearance (6,8) for the pipes, on opposite sides. The integral molding (120) and the molded parts (2) are provided with a central duct (10) extending between and transverse to the bilateral clearances and passing through the molding or the molded segments. The integral molded segments are plugged in geometrically locking manner onto a strip or a hollow shaped section (4). The intrgral molded segment (120) preferably is attached by injection molding to the hollow shaped section.

15 Claims, 3 Drawing Sheets

U.S. Patent  June 23, 1992  5,123,547
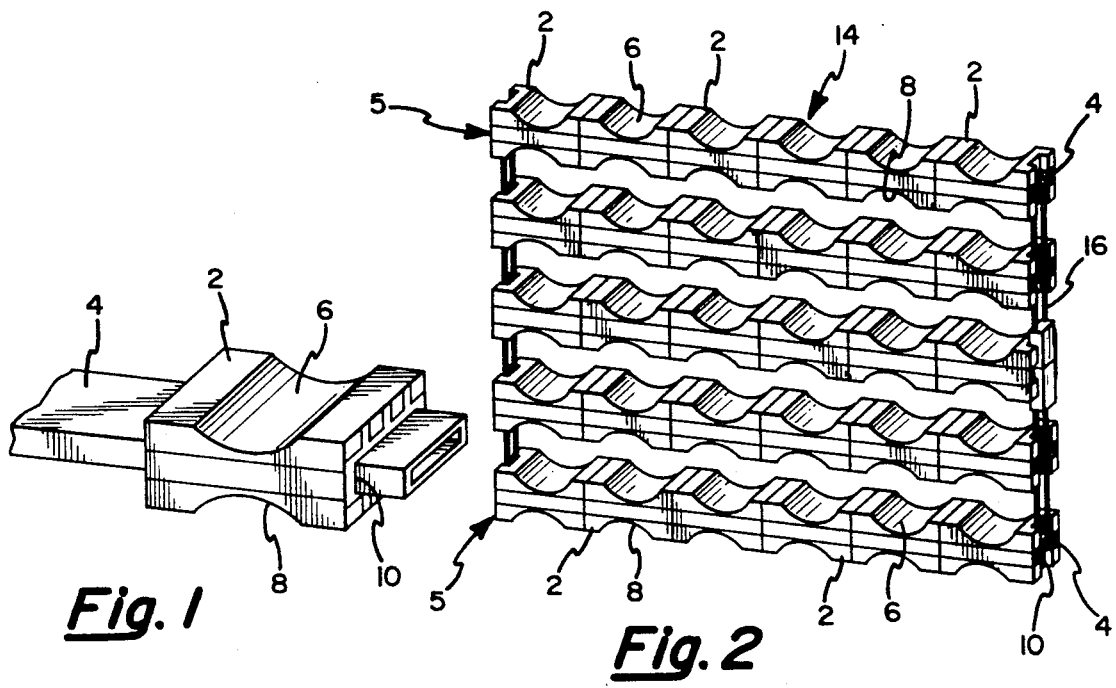
Fig. 1
Fig. 2
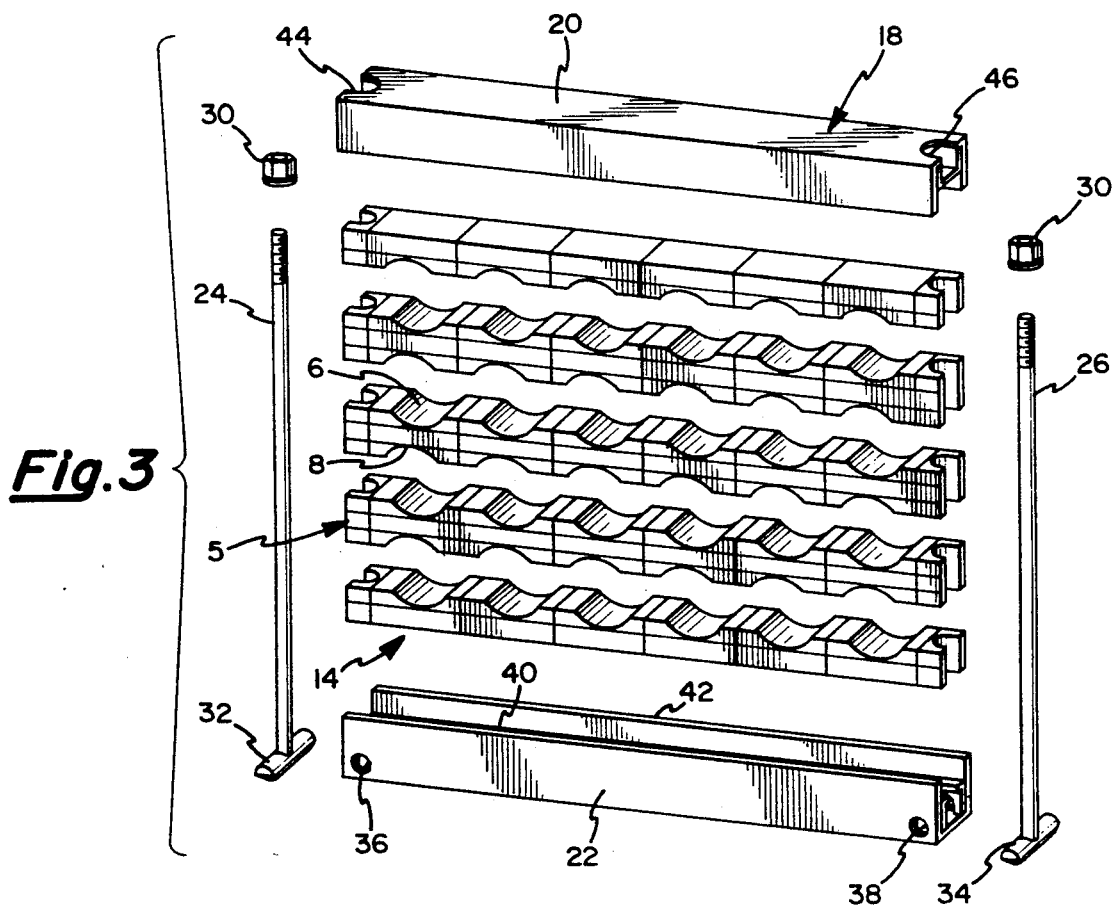
Fig. 3

EQUIPMENT FOR STORING AND SHIPPING PIPES

FIELD OF THE INVENTION

The invention concerns equipment for storing and shipping pipes.

BACKGROUND OF THE INVENTION

The publication (brochure) of Sigma-Chemie Inc. (Houston, U.S.A.) discloses two frames for pipes comprising frame parts with external (lower and upper) and central clearances for pipes. Comparatively thin steel channel sections or the like are used in one of the frames and are provided with steel/rubber pads for pipes, these pads being held together by several threaded bolts perforce passing through them. Shaped frame parts are used in the other frame, these parts being provided with lateral plug-in connecting means and being held together by a steel or plastic belt passing around the frame parts and the pack of pipes. The shaped or contoured frame parts consist of a steel/rubber compound. Both frames entail comparatively numerous components and complex designs, whereby their manufacture is expensive. The versatility is quite low.

The German Gebrauchsmuster 79 08 756 concerns an assembled system for stacking pipes in horizontal and superposed layers. The system comprises a frame consisting of a base support, lateral U-shaped uprights and an upper crossbeam. The base supports are provided with lateral cheeks and stops spaced apart at the top, the uprights being seated between these stops. Securing bolts hold the uprights in their assembly position to the base support, flush boreholes being provided for that purpose in the cheeks and in the uprights. The uprights thereby are vertically affixed to the base support. The uprights are connected in quite similar manner to the upper crossbeam, namely the uprights and the crossbeam comprise aligned boreholes passing the plug-in bores. Several superposed layers of pipes are separated from one another by transverse laths if the pipes include bushes or other projecting parts. Again this frame consists of relatively many individual parts of which handling is laborious and time-consuming and its manufacturing cost is high.

The German patent 31 28 840 discloses a frame for shipping and storing pipes with several superposed frame parts consisting of channel or shaped sections, the particular upper and lower frame parts being connectable by rods passing through clearances in the shaped-section frame parts. The shaped-section frame parts are rectangular sections. Each rod can be inserted by an end comprising a cross-piece each with one leg into one of two transverse boreholes of the hollow section and can pivot in the transverse boreholes. When pivoted upward, they can be moved into the clearance designed as a stop in the direction of the cross-piece. The frame comprises inside, vertical reinforcing walls each of which evinces at its end an externally open clearance. While fewer parts are resorted to in this known frame, whereby assembly and dis-assembly shall be simpler and more rapid, the frame parts on the other hand are still fairly complex and thereby manufacturing costs remains fairly high.

OBJECTS AND SUMMARY OF THE INVENTION

An object of the present invention therefore is to so design equipment of the initially cited kind for storing and shipping pipes that the manufacturing costs shall be lowered and the equipment can be used in more versatile manner.

Equipment for storing and shipping pipes includes several superposed pipe supports wherein the pipe supports each comprise a long, integral molding with several cylindrical clearances or openings acting as rest for several pipes on two opposite sides. Several short molded segments can be assembled and substituted for the long, integral moldings. Each of the short molded segments includes at least one cylindrical clearance to act as a rest for the pipes on two opposite sides. The integral molding and the molded segments are provided with a central duct passing between the clearances on both sides and transverse thereto or through the molded segments and a strip or hollow shaped section passes through the central duct to hold the integral molding or the molded segments together. The duct and the hollow strip have the same cross-sectional shapes, the inside dimensions of the duct corresponding approximately to the outside dimensions of the hollow sections.

The long integral molding is integrated by injection molding into the strip or hollow shaped section. The duct has a rectangular cross-section and the hollow strip is a rectangular tube.

Several superposed pipe supports can be held together using one or several steel or nylon bands which pass through at least the upper most and the lower most hollow strip.

A clamping frame can be provided to hold several superposed pipe supports together and comprises two U-shaped channels between which the stack of pipe supports are held. The clamping frame is tightened into place using two lateral, pivotable threaded rods.

The molded segments and the integrated molding are made of plastic and the hollow strips are made of steel rectangular tubes.

The hollow shaped section is formed of two substantially identical C-shaped channels assembled as a rectangular hollow strip. The hollow strip may also be formed of a rectangular tube having short cut-outs at the top, bottom and sides at the ends near the longitudinal edges and the tube segments between the cut-outs are bent upward and downward.

The pipe-support molded segments are formed of cross-sectionally C-shaped upper and lower molding halves. One of the two C legs of the molding halves comprises at its end side short projections and the other C-shaped leg comprises blind bore holes matching said projections. Preferably the molding halves are identical. In another embodiment the upper and lower most pipe support in the stack of pipe supports comprise at both ends hollow strips having projecting parts. Each of the parts have lateral constrictions and a central vertical bore hole. A molding formed with a T-shaped opening is linked to one end of a threaded rod and can be plugged onto the lower or upper part with the T-bar of the molding corresponding in width and height to the width and height of the hollow strip and of which the T-stem corresponds by its width to the width of the lateral constrictions and the other end of the threaded rod can be made to pass through the bore hole of the upper and lower part to receive a threaded nut to tighten the pipe supports together. The pipe supports mounted between the upper and lower pipe supports include lateral U-shaped moldings mounted on end segments of the hollow strips comprising corresponding the U-shaped clearances for the threaded rod. The threaded rod includes at its lower end, a cross piece which can be inserted into transverse bore holes located in the legs of the lower U-channels.

The equipment of the invention makes use of a hollow, strips section to receive one integral molding or several molded segments, i.e., the equipment for storing and shipping pipes in principle need be assembled only from two components. The hollow shaped sections are easily cut to the desired length and can be provided with a correspondingly long molding or a desired number of molded segments so that versatile application shall be provided. The moldings or molded segments and the hollow, shaped sections are easily manufactured per se and as a result the total manufacturing costs can be kept low. Because the pipe support in principle need be assembled only from two different components, storage too is quite economical.

The pipe-support moldings preferably are made from plastic employing conventional, economical manufacturing methods. The hollow shaped strips receiving the moldings preferably shall be economical steel strips.

BRIEF DESCRIPTION OF THE DRAWINGS

The invention is elucidated below in relation to the enclosed drawings.

FIG. 1 is a first embodiment of a pipe support of a molded segment and a hollow shaped section of the equipment for storing and shipping pipes, FIGS. 2, 3 show several pipe supports forming a stack of pipe supports, respectively showing a first and second embodiment mode to keep the stack together.

FIG. 1 shows the basic components of equipment for storing and shipping pipes. These basic components are individual pipe-support molded segments 2 and hollow rectangular shaped strips 4 upon which can be plugged one or more short molded segments 2 to form a pipe support 5.

Figure 4:
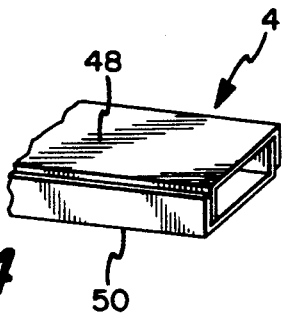
FIGS. 4, 5 show two further embodiment modes of hollow shaped strips forming of the pipe support.

Each molding comprises one cylindrical clearance 6,8 to store pipes at its upper and lower sides and a rectangular duct 10 transverse to the clearances and passing between them, together with which the molded segment 2 is slipped or plugged onto the hollow rectangular strips 4 which in this case is a hollow rectangular tube. Depending on the length of the rectangular tube 4, several molded segments 2 may be slipped on.

Preferably the molded segment 2 is made of plastic and the rectangular tube 4 is a steel shaped section.

Several pipe supports 5 may be vertically stacked one on the other with several molded segments 2 on one rectangular tube 4 to form one stack 14 of pipe supports in the manner shown by FIGS. 2 and 3. When being shipped, the stacks 14 are kept together by steel or nylon bands 16 or by a tightening frame 18.

The steel or nylon band 16 preferably passes through the upper and the lower rectangular tube—see FIG. 2. The tightening frame 18 consists of an upper and lower U-channel 20, 22 which can be laterally tightened relative to each other by means of threaded rods 24, 26 pivotably resting in the lower U channel 20 and by means nuts 30. The threaded rods 24, 26 respectively comprise a cross-piece 32 and 34 for the purpose of pivotable rests. The cross-pieces can be inserted into transverse boreholes 36, 38 of the legs 40, 42 of the lower U channel 22. The upper U channel 20 comprises recesses 44, 46 at both ends to seat the nuts 30 in masked manner.

Figure 5:
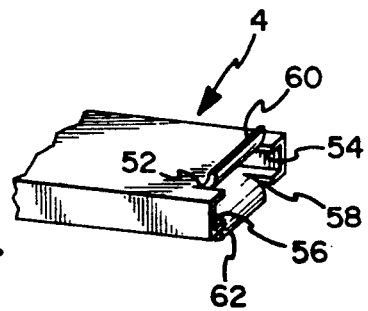

FIGS. 4 and 5 show two further embodiments of the hollow strips 4. In the embodiment mode of FIG. 4, the hollow strip 4 is formed by two identical C channels 48, 50 assembled into one rectangular hollow shaped section. The hollow strip 4 of FIG. 5 basically evinces the same design as that of FIG. 1 from which it merely differs in that short cutouts 52, 54, 56 and 58 are present at the ends at the top and bottom near the longitudinal edge and in that the tube segments 60, 62 between the cut-outs are bent upward and downward.

Figure 6:
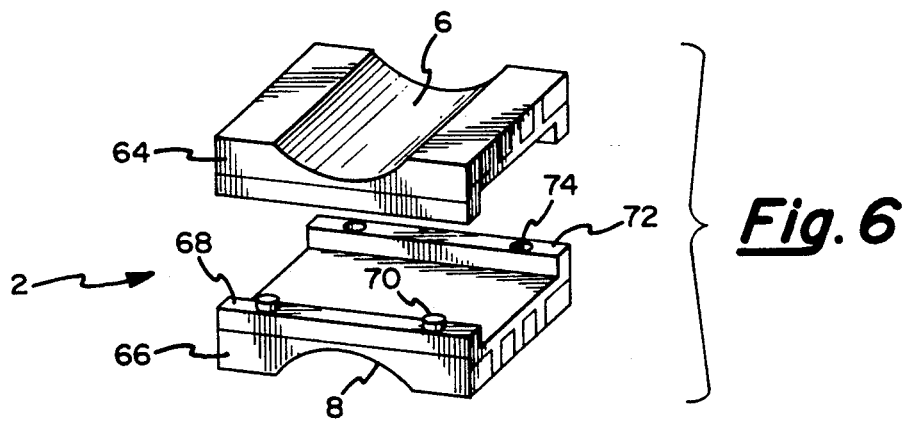
FIG. 6 is a second embodiment of a molded segment.

FIG. 6 shows another embodiment mode of a pipe-support molded segment 2. This molded segment consists of an upper and lower, cross-sectionally C-shaped molded half 64 and 66 which can be joined together. The two molded halves are identical. One of the C legs, i.e. 68, comprises short projections 70 at the end side and matching blind holes 74 are present at the other C leg 72.

Figure 7:
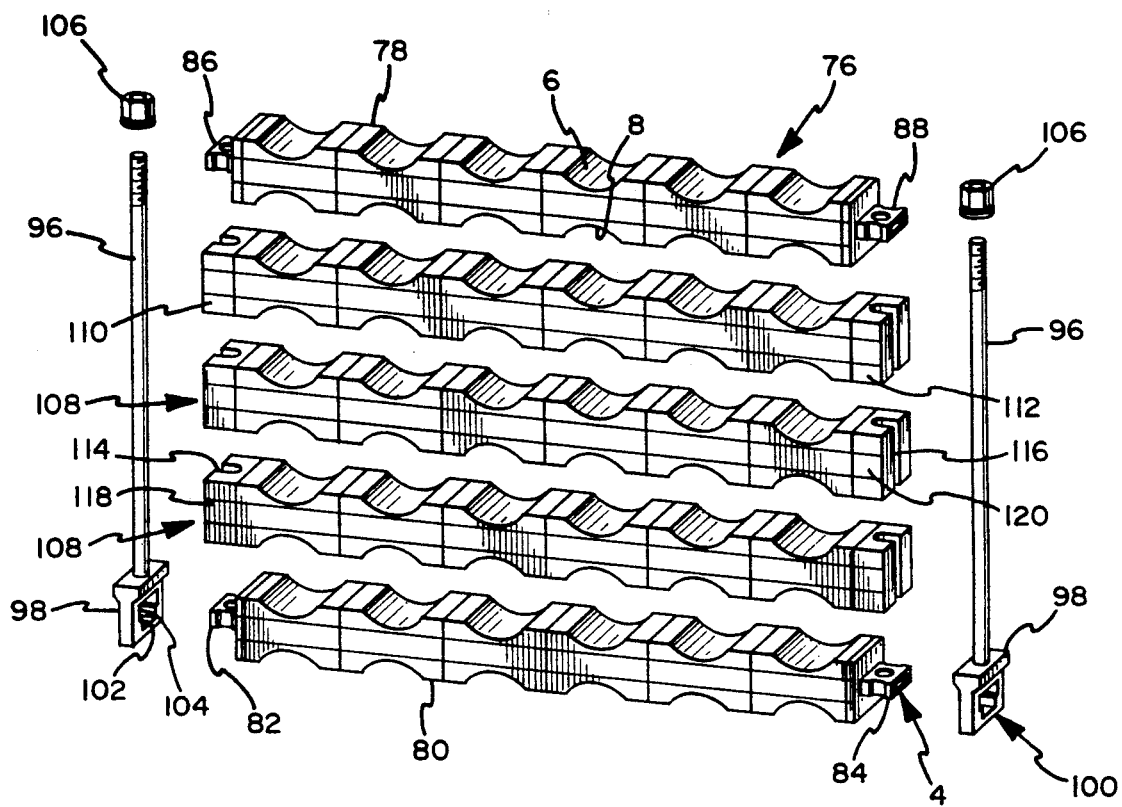
FIG. 7 is a third embodiment mode of pipe supports and shows a device to hold together a stack of pipe supports.
Figure 8:
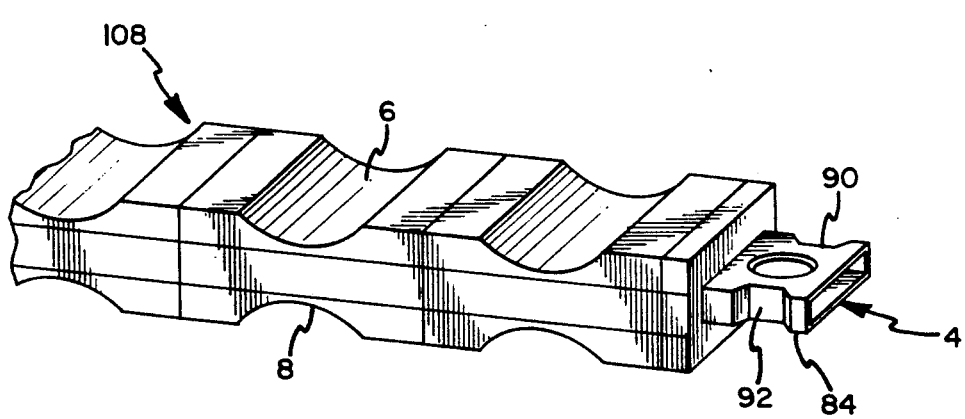
FIG. 8 is a pipe support of the embodiment mode of FIG. 7 shown on a larger scale.

FIGS. 7 and 8 show a further embodiment of pipe supports and of a system to holding together a stack of pipe-supports. The uppermost and lowermost pipe supports of a stack 76 of pipe supports comprise strips or hollow shaped sections projecting at both ends by parts 82, 84, 86, 88 from the pipe supports. Lateral constrictions 90, 92 and a central, vertical borehole 94 are present in these parts 82, 84, 86, 88—in particular see FIG. 8. A molding 98 with a T-shaped opening 100 can be plugged onto the lower, laterally projecting parts 82, 84. The T-bar 102 of opening 100 corresponds in width and height to the width and height of the strip or hollow shaped section 4. The width of the T-stem 104 of opening 10 corresponds to the width of the lateral constrictions 90, 92. The other end of the threaded rod 96 can be passed through the vertical borehole 94 of the upper projecting parts 86, 88 of the strip or hollow shaped section 4. Then a nut 106 can be screwed on to tighten the pipe supports of the stack of pipe supports. When tightening the nut 106, the threaded rod 96 together with the molding 98 will be pulled upward until the T-stem 104 of the T-shaped opening 100 snaps into the lateral constrictions 90, 92 of the parts 82, 84 of the hollow strip 4. When loosening the nut 106, the threaded rod together with the molding 98 can be lowered again until the T-bar 102 of the T-shaped opening 100 rests on the projecting parts 62 and 84; thereupon the moldings 98 can be pulled down by said parts.

The pipe supports 108 mounted between the upper and lower pipe supports 78, 80 may comprise lateral U-shaped moldings 110, 112 as shown in FIG. 7, which are provided with end segments 118, 120 of the hollow strips 4, having matching U-shaped clearances 114, 116, in order to receive the threaded bolt 96. The U-shaped moldings 110, 112 however also may be integrated to the terminal pipe-support molded segments.

Figure 9:
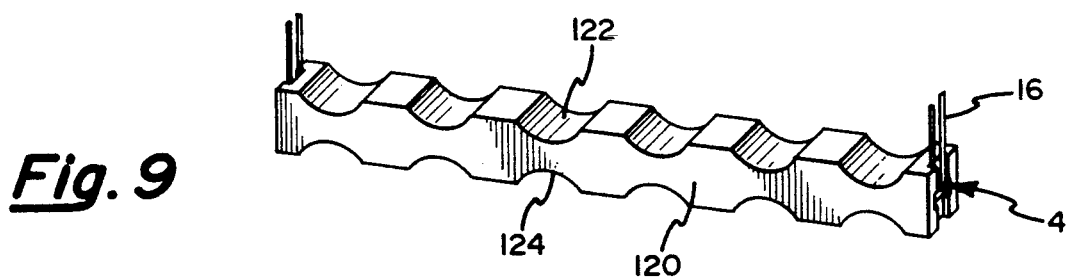
FIGS. 9, 10 are further embodiment modes of pipe supports. DETAILED DESCRIPTION OF THE DRAWINGS To simplify the description, the same components are referenced by the same numerals in the Figures of the drawing.
Figure 10:
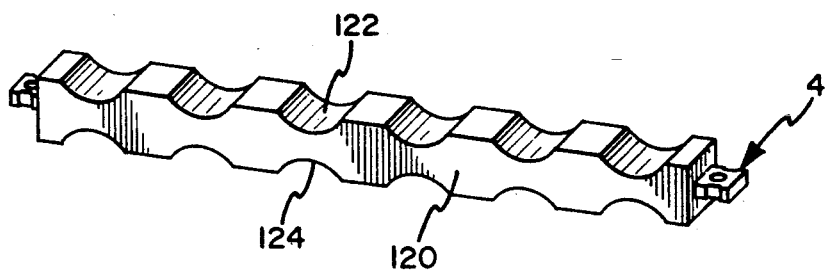

The pipe support 5 shall be especially simple and economical to manufacture if it consists of a long, integral molding 120 with several cylindrical clearances 122, 124 present at two opposite sides and serving as supports for several pipes, as shown by FIGS. 9 and 10, said molding being injection molded onto the strip or hollow shaped section 4.

I claim:

1. Equipment for storing and shipping pipes, comprising:
   a) a pipe supporting means forming an integral molded segment having opposite sides;
   b) said opposite sides having at least one depression for acting as a rest for a pipe;
   c) said pipe supporting means includes a central duct passing between the depressions and transverse thereto;
   d) said pipe support includes a hollow strip located in said central duct for locking a plurality of said molded segments together.

2. Equipment for storing and shipping pipes as set forth in claim 1, wherein:
   a) said strip and said duct have substantially similar cross-sectional shapes whereby the inside dimensions of the duct correspond approximately to the outside dimensions of the strip.

3. The equipment for storing and shipping pipes as set forth in claim 1, wherein:
   a) said molded segments are joined to said strip by injection molding.

4. The equipment for storing and shipping pipes as set forth in claim 1, wherein:
   a) said duct has a rectangular cross-section and said strip is a rectangular tube.

5. The equipment for storing and shipping pipes as set forth in claim 1, wherein:
   a) at least one band is used to hold together several superposed pipe supports and pass through at least an uppermost strip and a lowermost strip.

6. Equipment for storing and shipping pipes, as set forth in claim 1, wherein:
   a) a clamping frame maintains several superposed pipe supports in close relationship;
   b) said clamping frame includes at least two U-shaped channels; and
   c) a stack of pipe supports are located between said two U-shaped channels and are held in position by two laterally spaced rods which are connectable to said U-shaped channels.

7. Equipment for storing and shipping pipes as set forth in claim 1, further comprising:
   a) said molded segments are formed of plastic and said strips are formed of steel.

8. Equipment for storing and shipping pipes as set forth in claim 1, wherein:
   a) said strips are formed of two identical C-shaped channels assembled to form a rectangular hollow shaped section.

9. Equipment for storing and shipping pipes as set forth in claim 4, wherein:
   a) said rectangular tube includes a pair of ends having top and bottom sides;
   b) said rectangular tube includes cut-outs located at said top and bottom side of said ends, and
   c) said tube includes upwardly and downwardly bent portions between said cut-outs.

10. Equipment for storing and shipping pipes as set forth in claim 1, wherein:
    a) said pipe-support molded segments include upper and lower molding halves, and
    b) said upper and lower molding halves are C-shaped.

11. Equipment for storing and shipping pipes as set forth in claim 10, wherein:
    a) each of said C-shaped upper and lower molding halves include two C legs;
    b) one of said upper and lower molding halves includes short projections on its respective legs and the other molding half has blind bore holes matching said projections.

12. Equipment for storing and shipping pipes as set forth in claim 10, wherein:
    a) said molding halves are identical.

13. Equipment for storing and shipping pipes, comprising:
    a) a stack of pipe supports having upper most and lower most pipe supporting members;
    b) each of said upper most and lower most pipe supporting members having hollow strips and pipe supporting molding mounted to said hollow strips;
    c) each of said hollow strips having a pair ends, said ends having parts projecting therefrom;
    d) said parts including lateral constrictions and a central vertical borehole;
    e) said stack of pipe supports having connection means for connecting said upper most pipe support member to said lower most pipe support member;
    f) said connection means including a rod having a molding at a first end;
    g) said molding having an opening therein having a wider top portion at the narrower bottom portion; and,
    h) said rod having a second end having a second connection means for connecting said rod to another of said pipe support members.

14. Equipment for storing and shipping pipes as set forth in claim 13, further comprising:
    a) additional pipe supporting members are mounted between said upper most and lower most pipe supporting members; and,
    b) said additional pipe supporting members at a pair of end segments having lateral U-shaped moldings thereon forming U-shaped openings providing clearance for said rod.

15. Equipment for storing and shipping pipes as set forth in claim 6, wherein:
    a) said U-shaped channels have a pair of ends;
    b) said ends have formed therein a transverse borehole;
    c) said laterally spaced rods each includes a cross piece at one end thereof;
    d) said cross piece is insertable into said transverse boreholes to connect said rods to said U-shaped channels.

* * * * *